(No Model.) 2 Sheets—Sheet 1.

O. LE G. NOBLE.
MACHINE FOR FORMING CUTTERS.

No. 598,002. Patented Jan. 25, 1898.

Witnesses:
A. D. Harrison.
R. M. Pierson

Inventor:
O. L. Noble
by Wright Brown & Quinby
Attys.

(No Model.) 2 Sheets—Sheet 2.
O. LE G. NOBLE.
MACHINE FOR FORMING CUTTERS.
No. 598,002. Patented Jan. 25, 1898.
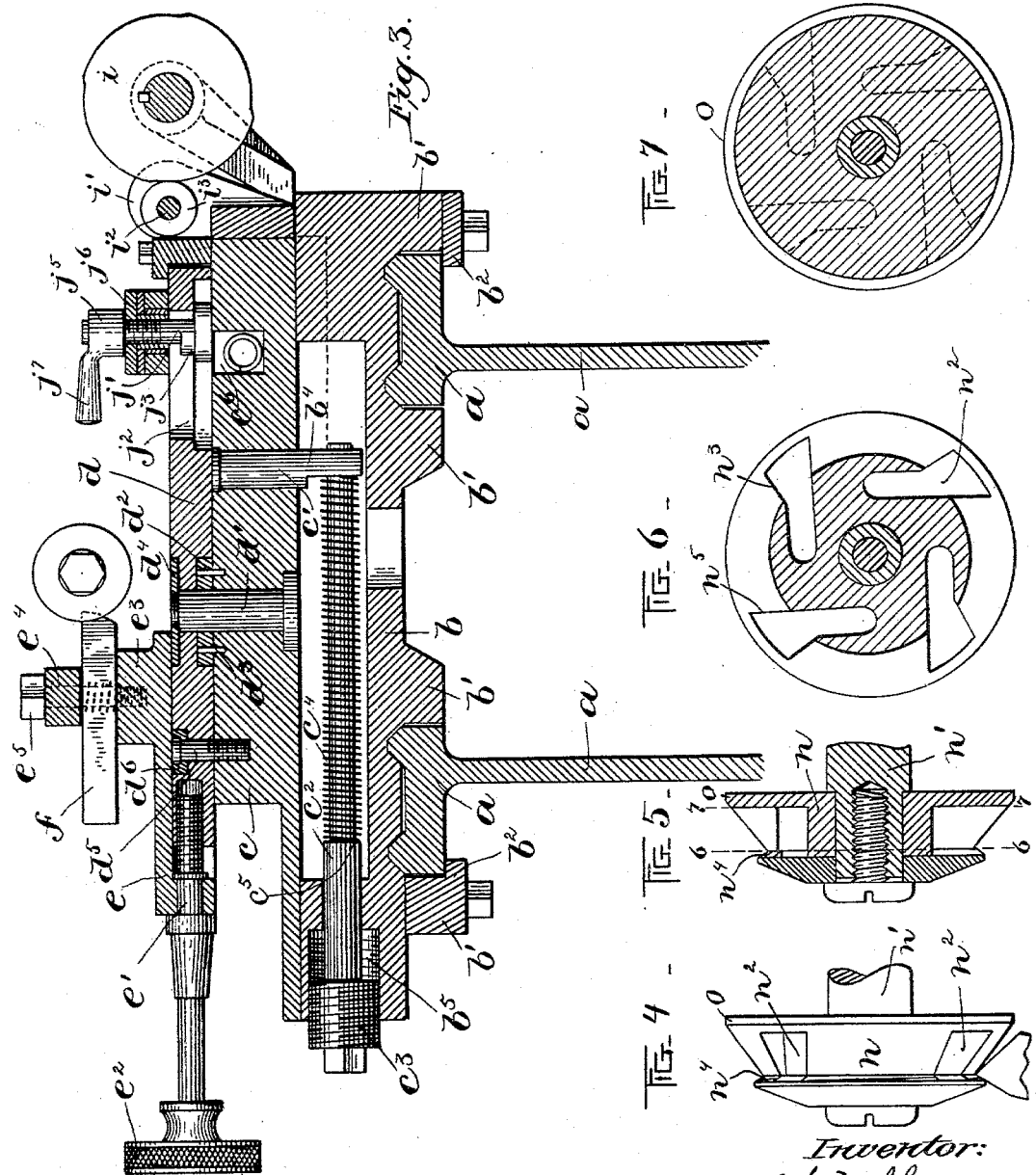
Witnesses:
A. D. Harrison
R. M. Pierson
Inventor:
O. L. Noble
by Knight Brown & Quinby
Attys.

UNITED STATES PATENT OFFICE.

OSCAR LE GRAND NOBLE, OF WINTHROP, MASSACHUSETTS, ASSIGNOR TO FRANK WOOD, TRUSTEE, OF BOSTON, MASSACHUSETTS.

MACHINE FOR FORMING CUTTERS.

SPECIFICATION forming part of Letters Patent No. 598,002, dated January 25, 1898.

Application filed January 25, 1897. Serial No. 620,671. (No model.)

*To all whom it may concern:*

Be it known that I, OSCAR LE GRAND NOBLE, of Winthrop, in the county of Suffolk and State of Massachusetts, have invented certain new and useful Improvements in Machines for Forming Cutters, of which the following is a specification.

This invention has relation to machines for manufacturing cutting-blades and rotary cutters where the clearance back of the cutting edge is required to be greater on one side from front to back than on the other side.

The present machine, which is one embodiment of the invention, is designed to produce by its operation a rotary cutter for trimming the rand and heel-seat of a boot or shoe which will be perfect in its operation and require very little or no manual or skilled labor to finish it. Heretofore it has been practically impossible to produce a cutter of this character by the operation of a machine, owing to the fact that in order to back or cut away that portion of the disk in front of each cutting edge to render the edge operative and to give clearance it was necessary to cut away that portion of the tool which is used as a guide and pressed against the heel, so that as constructed the circular rest was cut away in places and caused the cutter to vibrate when in use, so as to detract from its efficiency. My machine, however, is so constructed and operated that the cutter is backed off and reduced in front of the cutting edge without marring or cutting away the guiding portion of the cutter, and a portion of the lip that enters the rand is reduced to give it a clearance in rear of the rand-cutting edge.

To these ends the invention consists of a machine embodying those features of construction and arrangement which I shall now proceed to describe in detail, and then point out in the claims hereto annexed.

Reference is to be had to the accompanying drawings, forming a part of this specification, in which like letters of reference indicate like parts or features wherever they occur.

Figure 1:
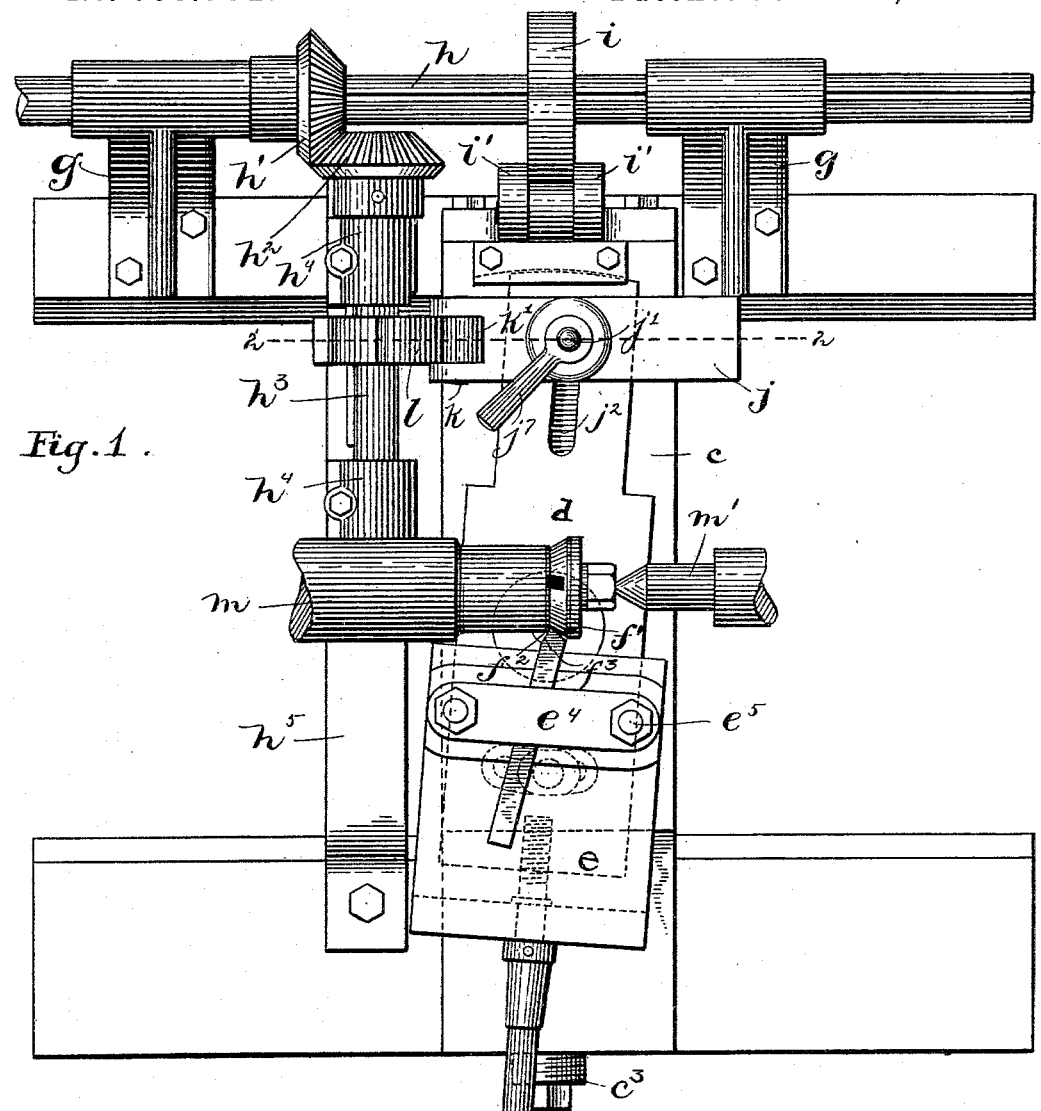
Figure 2:
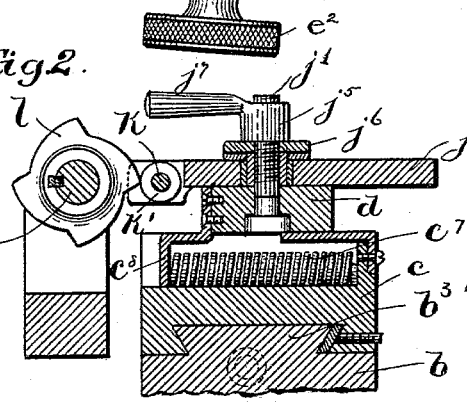

Of the drawings, Figure 1 is a plan view of a machine combining my improvements. Fig. 2 is a cross-section on the line 2 2 of Fig. 1. Fig. 3 is a longitudinal vertical section through the machine. Figs. 4, 5, 6, and 7 show the cutter which is formed by my improved machine.

Of the drawings, $a$ $a$ indicate the parallel guide-bars of the body of a lathe, on which the carriage $b$ is mounted to slide, said carriage being provided with downwardly-projecting flanges $b'$ $b'$, which, together with the inwardly-projecting stops $b^2$ $b^2$, secure it in place. The carriage $b$ is formed with a dovetailed tongue $b^3$, to fit in a correspondingly-shaped groove in a slide $c$, which is provided with a post $c'$, extending down into a groove $b^4$ in the carriage, through the lower end of which the pin $c^2$ passes, the outer end of the pin being formed with an enlarged threaded head $c^3$, screwed into an internally-threaded socket $b^5$ in the carriage, so as to be adjustable longitudinally thereof, there being a spring $c^4$ coiled around the pin and having one end bearing against the post $c'$ and the other end bearing against a shoulder $c^5$ on the pin $c^2$. Now it will be seen that if the slide be moved to the left, as shown in Fig. 3, and released the spring will force it back to its normal position.

Upon the slide $c$ is pivoted, by means of a bolt $d'$, an oscillatory lever $d$. The lever is formed in its under face with a socket to receive a boss $d^2$ surrounding the bolt and secured to the slide by pins $d^3$, the upper end of the bolt being threaded to receive a ring-nut $d^4$ countersunk in the upper face of the oscillatory lever. The lever is guided in its movements by a screw $d^5$ passing through it into the slide and provided with a roller $d^6$, lying in an arc-like slot in the said lever. The slide is formed with a cross-groove $c^6$ to receive a tension-spring $c^7$, one end of which bears against the slide and the other end of which bears against an abutment $c^8$, secured by bolts to the lever $d$. Upon the lever is secured the tool-holder $e$, which is provided in its under face with a groove to receive the said lever, and which may be adjusted relatively thereto by a screw $e'$, having a milled head $e^2$. The said holder is provided with a raised portion $e^3$, on which the tool is clamped by cross-bars $e^4$ and two screws $e^5$.

The tool is of the shape shown in Figs. 1 and 3 and has cutting edges $f'$ and $f^3$, terminating in a point $f^2$, which point is arranged directly coincident with the axial line of the pivot-bolt $d'$ on which lever $d$ oscillates. Now it will be seen that the tool-holder is not only arranged to be swung around the pivot-bolt $d'$, but it is also arranged to be moved longitudinally of the carriage, this all being for a purpose to be described.

Mounted in bearing-brackets $g\ g$, secured to the carriage, is a grooved driving-shaft $h$, provided with a bevel-wheel $h'$, feathered to the shaft, so as to be rotated thereby, while adapted to slide longitudinally thereon, which bevel-wheel intermeshes with a corresponding bevel-wheel $h^2$, mounted on the end of a grooved shaft $h^3$, journaled in bearings $h^4\ h^4$ on the carriage. The shaft $h$ is also provided with a cam-wheel $i$, having as many rises as there are to be teeth in the cutter, four being shown in the drawings, and splined to the shaft so as to slide thereon but be rotated thereby. It is held in proper relationship to the carriage by arms $i'\ i'$, extending up from the slide, and in which arms is journaled the shaft $i^2$, having a roller $i^3$, against which the cam bears. The rotation of the shaft $h$ causes the reciprocation of the slide on the carriage once for each rise of the cam as it revolves. The lever is provided with a cross-bar $j$, secured thereto by a bolt $j'$, passing through a slot $j^2$ in said bar $j$ and having its head located in a wide groove in the under face of the plate. The bolt is prevented from rotating by a lug $j^3$, which projects into the slot $j^2$. Non-threaded bushings are arranged around the bolt, and a nut $j^5$, threaded onto the end of the bolt, bears against suitable washers $j^6$, placed around the bolt, so that the cross-bar is free to rotate about its axis. Now it will be seen that the cross-bar $j$ may be adjusted longitudinally relatively to the plate and may be secured in place by means of the screw $j^5$, which is provided with the handle $j^7$.

In the end of the cross-bar $j$ is journaled a shaft $k$, having a roller $k'$ in operative relation to a cam $l$, mounted upon the shaft $h^3$. The cam $l$ is likewise provided with the same number of rises as cam $i$ on shaft $h$ and is arranged to oscillate the lever once for each longitudinal motion of the slide $c$.

$m$ represents the chuck of the lathe, in which the cutter-blade is secured and held in place by the lathe-spindle $m'$.

The operation of the machine is as follows: A cutter-blank having been placed in the lathe, the carriage and the slide thereon are adjusted until the point $f^2$ of the tool, which is in alinement with the axial line of the bolt $d'$, just touches the innermost line of the groove in the cutter. Then, motion being imparted to the shaft $h$ and to the shaft of the spindle $m$, the two shafts being rotated in unison at the same rate of speed, the slide will be reciprocated and the lever will be oscillated, so as to produce a cutter such as shown in Figs. 4 to 7. By reason of the peculiar motion which is given to the parts and their relationship the cutting-tool acts upon the cutter in such way as to form a clearance back of each cutting edge, the maximum depth of the clearance on the face of the cutter occurring at the base of the lip and diminishing as it approaches that portion of the cutter which forms a rest, until it disappears in the circle of the latter. The same oscillating movement of the tool forms a clearance on the side of the rand-cutting lip, its maximum being at its outer peripheral edge and diminishing at its base.

In Figs. 4 to 7, inclusive, I have illustrated the cutter which is backed by my machine. $n$ indicates the body of a disk which is mounted on a spindle $n'$ and is cast with the eccentric recesses $n^2$, the edges $n^3$ of which act as cutters. It also has a lip $n^4$, so that the continuation of the edges $n^3$, as $n^5$, in the lip form cutting edges for the rand of a shoe. The beveled face of the disk is backed or cut away gradually from the edge $n^3$ to the edge $n^5$ by the cutting-tool of the machine, so that each edge $n^5$ will project beyond the remainder of the beveled face and attack the leather against which it is brought in contact. The circular edge $o$ of the disk is unimpaired, and by examining Fig. 7 it will be seen that the disk is circular in section on the line 7 7. This edge $o$ in using the cutter for work on shoes is rested against the heel and serves to guide the cutter, so that if the edge were not exactly true and concentric it would not rest firmly against the heel and would cause the cutter to vibrate.

Heretofore it has been the practice to form cutters of this class by intermittingly feeding a laterally-stationary cutting-tool against the cutter-blank to back or reduce the bevel before and in the rear of each cutting edge, so that the edge $o$ was likewise reduced at points, whereby the cutter would not rest evenly against the heel, whereas in the operation of my machine the point of the cutting-tool moves in a straight line transversely relatively to the cutter-blank, and the edges $f'\ f^3$ thereof swing around the pivot $d'$, while also moving transversely of the cutter-blank. The parts are so timed that when the edge $f'$ begins to swing toward the bevel of the cutter-blank a rise on the cam $i$ forces the slide and the cutting-tool away from the cutter-blank, with the result that the bevel is backed between the lines 6 6 and 7 7, Fig. 5, without reducing or cutting away the edge $o$. The movement of the tool in the reverse direction also causes the edge $f^3$ thereof to back or reduce the lip $n^4$ in rear and in front of each cutting edge $n^5$, as shown in Fig. 4.

It will be understood that I do not limit myself to the details of construction shown and described, nor to the particular use of the machine set forth, as it may be employed for cutting other devices and may have its parts materially changed without departing from the spirit and scope of the invention.

Having thus explained the nature of my invention and described a way of constructing and using the same, although without attempting to set forth all the ways in which it may be made or all the modes of its use, I declare that what I claim is—

1. In a machine of the character described, in combination, a tool-holder, a pointed tool, a pivot for said holder directly in line with the point of said tool, means for oscillating said holder about its pivot, and means for imparting an intermittent longitudinal reciprocatory movement thereto.

2. In a machine of the character described, in combination, a cutting-tool having two cutting edges converging in a point, a slide reciprocatory longitudinally of said tool, a tool-holder pivoted to said slide to oscillate about an axis in line with the point of said tool, and means for simultaneously reciprocating said slide and oscillating said tool-holder.

3. In a machine of the character described, in combination, a cutting-tool, a longitudinally-reciprocatory slide, a lever pivoted thereon, a tool-holder supported by said lever and adjustable relatively thereto, and means for reciprocating said slide and oscillating said lever.

4. In a machine of the character described, in combination, a cutting-tool, a tool-holder, means for reciprocating said holder longitudinally, means for oscillating said holder transversely, and means for varying the length of the oscillatory movement of said holder.

5. In a machine of the character described, in combination, a cutting-tool, a tool-holder, a pivoted lever supporting said holder, a reciprocatory slide to which said lever is pivoted, said slide and said lever being under spring-pressure, and means for simultaneously moving them intermittently against the pressure of the spring.

6. In a machine of the character described, in combination, a rotating chuck or work-holder, parallel guide-bars, a carriage sliding on said bars, a tool, a tool-holder mounted on the carriage, and two rotating shafts provided with means for longitudinally reciprocating and transversely oscillating said tool-holder.

7. In a machine of the character described, a rotating chuck or work-holder, a tool having two cutting edges converging in a point, means for reciprocating the point of the tool in a straight line transversely of said chuck, and reciprocating the cutting edges in curved lines about an axis passing through the point of the tool.

In testimony whereof I have signed my name to this specification, in the presence of two subscribing witnesses, this 19th day of January, A. D. 1897.

OSCAR LE GRAND NOBLE.

Witnesses:
A. D. HARRISON,
C. F. BROWN.